United States Patent [19]
Inaba et al.

[11] Patent Number: 5,052,908
[45] Date of Patent: Oct. 1, 1991

[54] TOGGLE TYPE MOLD CLAMPING APPARATUS IN AN ELECTRICALLY-OPERATED INJECTION MOLDING MACHINE

[75] Inventors: Yoshiharu Inaba, Kawasaki; Masato Yamamura, Yamanashi, both of Japan

[73] Assignee: Fanuc Ltd., Minimatsura, Japan

[21] Appl. No.: 474,044
[22] PCT Filed: Jul. 27, 1989
[86] PCT No.: PCT/JP89/00770
 § 371 Date: Apr. 19, 1990
 § 102(e) Date: Apr. 16, 1990
[87] PCT Pub. No.: WO90/02033
 PCT Pub. Date: Mar. 8, 1990

[30] Foreign Application Priority Data

Aug. 29, 1988 [JP] Japan ................. 63-212427

[51] Int. Cl.$^5$ .......................... B29C 45/80
[52] U.S. Cl. ................. 425/150; 425/451.5; 425/451.6; 425/451.9; 425/592; 425/593
[58] Field of Search ........... 425/150, 169, 171, 450.1, 425/451.5, 451.6, 451.9, 589, 590, 592, 593, 595

[56] References Cited

U.S. PATENT DOCUMENTS 4,741,685 5/1988 Inaba et al. ................. 425/571
4,877,388 10/1989 Inaba et al. ................. 425/589

FOREIGN PATENT DOCUMENTS 61-283518 12/1986 Japan ................. 425/593
62-87813 6/1987 Japan.
63-6825 1/1988 Japan.

Primary Examiner—Timothy Heitbrink
Attorney, Agent, or Firm—Staas & Halsey

[57] ABSTRACT

A mold clamping apparatus is provided, including upper and lower toggle sections disposed symmetrically with respect to an axis of the apparatus, each toggle section including a ball screw disposed radially outwardly of the apparatus with respect to the axis, a head threadedly engaged therewith, and links operable to expand and bend with reciprocal head motion along the ball screw, each ball screw being directly coupled to a corresponding one of two servomotors connected to a control circuit section including a pulse width modulation control circuit and two transistor inverters. The mold clamping apparatus has primarily structural components separated from the axis so that flexure of the toggle mechanisms and resultant non-uniformity of a pressing force onto the movable platen are eliminated, and each servomotor is small enough to drive a corresponding one toggle section, so that the resultant mold clamp apparatus is low in cost and high in operational response.

4 Claims, 2 Drawing Sheets

TOGGLE TYPE MOLD CLAMPING APPARATUS IN AN ELECTRICALLY-OPERATED INJECTION MOLDING MACHINE

BACKGROUND OF THE INVENTION

1. Technical Field

The present invention relates to a mold clamping apparatus for use in an electrically-operated injection molding machine, and more particularly, to a mold clamping apparatus having a toggle mechanism of a double toggle link type, which is capable of uniformly applying a pressing force onto a movable platen, and is low in cost and high in operational response.

2. Background Art

Typically, a toggle type mold clamping apparatus, mounted on an electrically-operated injection molding machine, includes a toggle mechanism having a pair of toggle sections which are disposed between rear and movable platens and are symmetric with each other in the vertical direction of the apparatus with respect to an axis of the same apparatus, the toggle sections being coupled to each other by means of a crosshead threadedly engaged with a ball screw which is disposed on the axis of the mold clamping apparatus. The mold clamping apparatus is so arranged that, as the crosshead is moved from its rear platen side toward the movable platen along the ball screw with rotation of the ball screws driven by a servomotor, two links of each of the toggle sections gradually expand to be switched from a state where there links are bent to another state where the links are stretched to establish a straight-line relationship therebetween, so as to apply a pressing force onto the movable platen. According to the mold clamping apparatus of this kind having the pair of toggle sections disposed symmetrically, it is possible to apply the pressing force generated by the toggle mechanism to the movable platen uniformly over the entire surface of the movable platen to a considerable extent. However, since primary parts of the mold clamping apparatus such as ball screw, crosshead, etc., are disposed and concentrated on the axis of the clamping apparatus, a flexure of the toggle mechanism is liable to occur, resulting in poor uniformity of the pressing force applied to the movable platen. Moreover, when a flexure of the ball screw occurs due to the weight of the ball screw and the weight of the crosshead and the like, this flexure produces forces which act on the upper and lower toggle sections in opposite directions (bending and expanding directions) from each other in respect of operational phases of these toggle sections, due to the vertically separated arrangement of the toggle sections. In this connection, the pressing force applied to the movable platen lacks uniformity. In this case, parallelism between the rear platen and the movable platen is deteriorated, and hence parallelism between the movable platen and the front platen is also deteriorated. Further, since a distance for which the pair of toggle sections are separated is large, the pressing force is applied to the movable platen at its peripheral portions separated from a central portion thereof, and hence the movable platen, in particular, a movable platen mounted with a small mold, is liable to be deformed, resulting in drawbacks such as the resultant molded products including burrs.

SUMMARY OF THE INVENTION

An object of the present invention is to provide a mold clamping apparatus for use in an electrically-operated injection molding machine, which is capable of suppressing a flexure of a toggle mechanism, and of eliminating non-uniformity of a pressing force applied to a movable platen resulting from the flexure of the toggle mechanism, and is low in cost and high in operational response.

In order to achieve the above-mentioned object, a mold clamping apparatus of the present invention which is mounted on an electrically-operated injection molding machine, includes: a first toggle section having a plurality of links which is operatively coupled to a head member threadedly engaged with a first ball screw, and is disposed radially inwardly of the mold clamping apparatus with respect to the first ball screw, the same screw being separated radially outwardly of the mold clamping apparatus from an axis of the apparatus, extending in parallel to the axis, and being rotatably supported; a second toggle section having a plurality of links which are operatively coupled to a head member threadedly engaged with a second ball screw, and are disposed radially inwardly of the second ball screw, the same screw being separated radially outwardly of the mold clamping apparatus from the axis, disposed at a side of the mold clamping apparatus remote from the first ball screw with respect to the axis, extending in parallel to the same axis, and being rotatably supported; first and second servomotors operatively coupled to the first and second ball screws, respectively; and control means for controlling drive of the first and second servomotors.

As mentioned above, according to the present invention, since a plurality of toggle sections, e.g., a pair of toggle sections, of the toggle mechanism are each separated radially outwardly of the mold clamping apparatus from the axis thereof, primary parts of the toggle mechanism are offset so as not to be concentrated on the axis of the apparatus, so that a flexure of the toggle mechanism is suppressed, and deteriorated parallelism between the movable platen and front, rear platens of the mold clamping apparatus is prevented. Further, since the pressing force from the plural toggle sections is applicable to a central part of the movable platen by adjusting a distance for which these toggle sections are separated, deformation of the movable platen produced upon application of the pressing force thereon can be reduced, and hence a deterioration in parallelism among the three platens due to the deformed movable platen can be reduced, so that the resultant molded products, free from burr or the like, are high in quality. Moreover, since the driving source of the toggle mechanism can include versatile servomotors each having a small capacity, the resultant mold clamping apparatus is low-priced and has an improved operational response.

DESCRIPTION OF THE PREFERRED EMBODIMENTS

Figure 1:
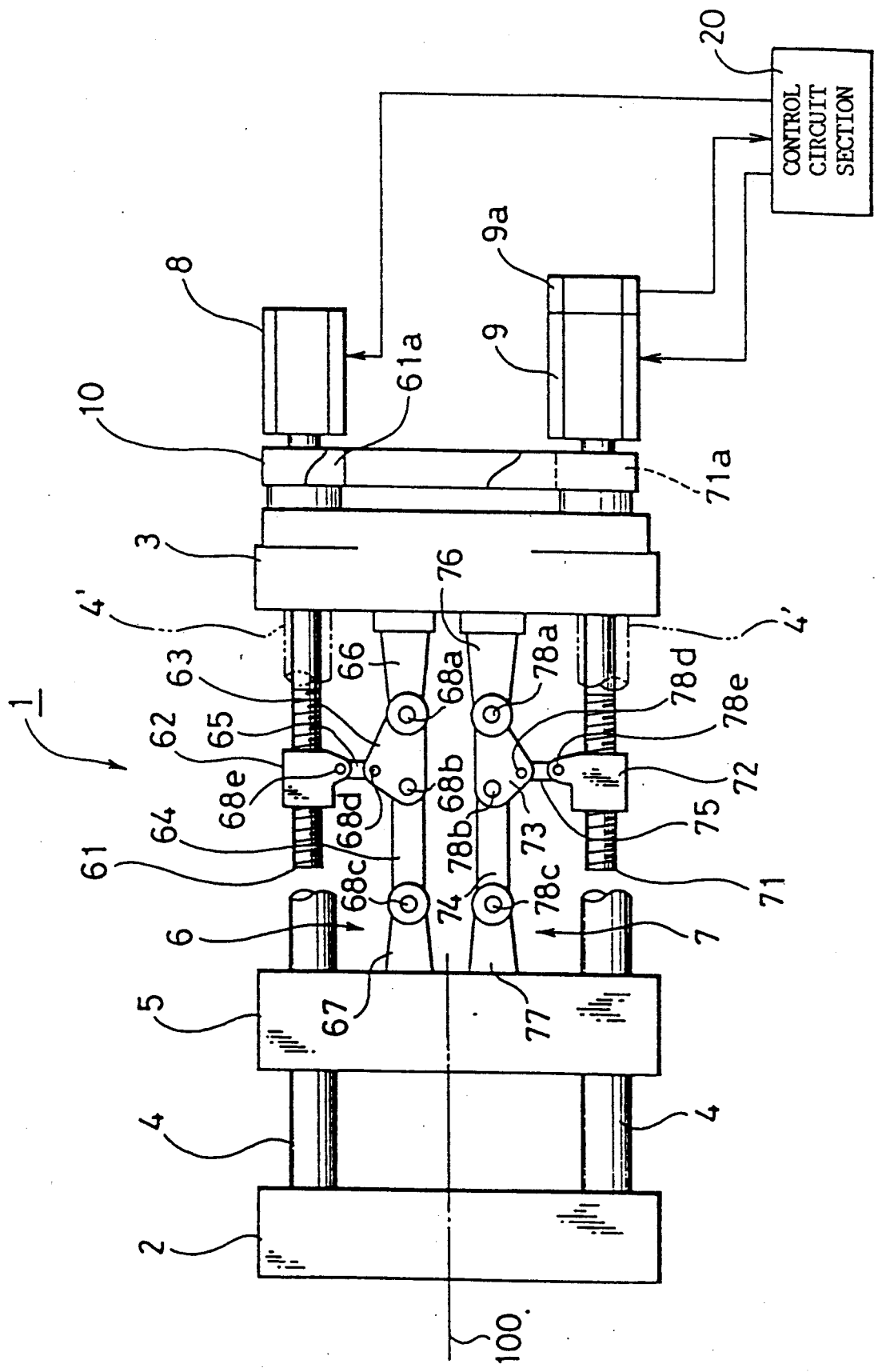
FIG. 1 is a schematic front view showing a mold clamping apparatus according to an embodiment of the present invention.

Referring to FIG. 1, a mold clamping apparatus 1 according to an embodiment of the present invention, mounted on an electrically-operated injection molding machine, includes a toggle mechanism of a double toggle link type having first and second toggle sections, i.e., upper and lower toggle sections 6 and 7, which are the same in construction and are disposed symmetrically with respect to an axis 100 of the mold clamping apparatus in the vertical direction of the same apparatus. The mold clamping apparatus is arranged to reciprocate a movable platen 5 along a pair of upper tie bars 4 and a pair of lower tie bars 4' between a front platen 2 and a rear platen 3, which are connected with each other by means of these tie bars 4, 4'. The front and movable platens 2, 5 are mounted with stationary and movable mold halves (not shown), respectively.

The upper toggle section 6 has an upper ball screw 61 extending through an upper edge portion of the rear platen 3 in parallel with the axis 100, an upper head 62 threadedly engaged with the upper ball screw 61, and first to third links 63–65. The upper ball screw 61 is supported by the rear platen 3 in a manner rotatable but axially immovable. The first link 63 has one end pivotally connected through a pin 68a with a tip end of a support member 66 which projects from a central portion of an end face of the rear platen 3 at the side facing the toggle mechanism, and another end pivotally connected through a pin 68b with one end of the second link 64. Another end of the second link 64 is pivotally connected through a pin 68c with a tip end of a support member 67 which projects from a central portion of the movable platen 5 at the side facing the toggle mechanism. Further, an intermediate portion of the first link 63 is pivotally connected through a pin 68d with an end of the third link 65 which has another end pivotally connected through a pin 68e with the upper head 62. The upper ball screw 61 has a shaft portion (not shown) extending through the rear platen 3, and a toothed pulley 61a is mounted on an outer end portion of the shaft portion for rotation in unison therewith, the outer end portion projecting from the end face of the rear platen 3 at the side remote from the toggle mechanism.

As mentioned above, the lower toggle section 7 is the same in construction as the upper toggle section 6, and comprises elements 71–77, 71a and 78a–78e which respectively correspond to the elements 61–67, 61a and 68a–68e respectively of the upper toggle section 6. A timing belt 10 is stretched between the toothed pulleys 61a, 71a respectively mounted on the shaft portions of the upper and lower ball screws 61 and 71, so as to keep the phases in rotary motion of these ball screws 61, 71 matched to each other.

Fixed through appropriate means (not shown) to the end surface of the rear platen 3 at the side remote from the toggle mechanism are first and second servomotors 8 and 9 each of which includes a permanent-magnetic synchronous motor, and the second servomotor 9 is provided with a velocity detector 9a such as a tachogenerator. The servomotors 8, 9 each have an output shaft connected through an appropriate means (not shown) to an outer end of the shaft portion of a corresponding one of the upper and lower ball screws 61, 71 for rotation in unison therewith. In the present embodiment, each motor output shaft is directly connected to the corresponding shaft portion. Each of the servomotors 8, 9 is arranged to be as small as possible in size but produce an output torque enough to drive a corresponding one of the upper and lower toggle sections 6 and 7. Accordingly, each servomotor has a rotor which is small in rotational inertia, and thus has an improved operational response.

Figure 2:
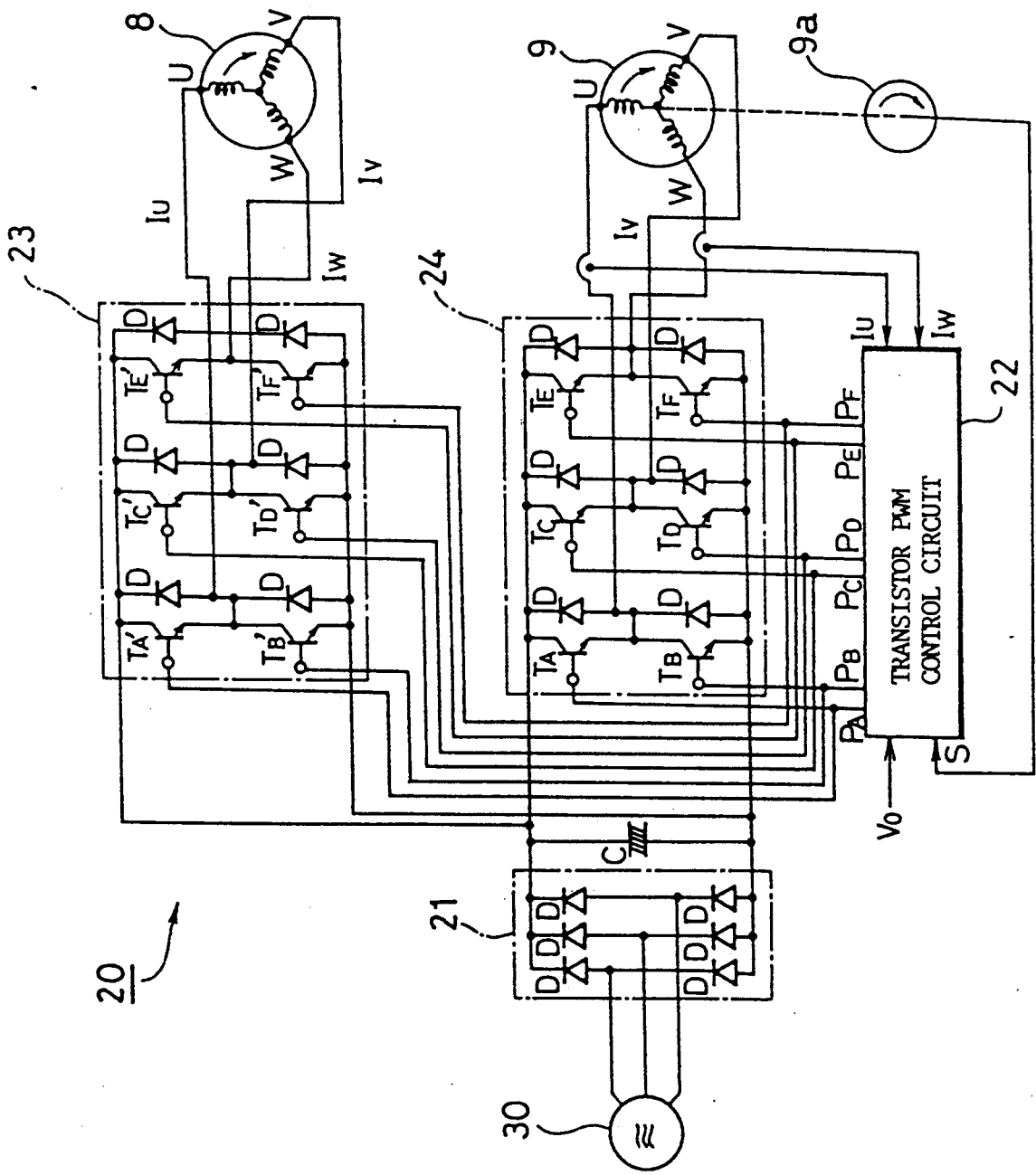
FIG. 2 is a schematic circuit diagram showing a control circuit section of the mold clamping apparatus of FIG. 1.

Further, the mold clamping apparatus 1 is provided with a control circuit section 20 for controlling the drive of the servomotors 8, 9. Referring to FIG. 2, the control circuit section 20, which is constructed basically in a conventional manner, consists of a rectifying circuit 21 connected to a three-phase external power source 30, a transistor PWM (pulse width modulation) control circuit 22, and a first transistor inverter 23 corresponding to the first servomotor 8, and a second transistor inverter 24 corresponding to the second servomotor 9. The PWM control circuit 22 is arranged to receive a commanded speed V0, supplied from a host controller, e.g., a numerical control unit (not shown) provided in the injection molding machine, and an output signal, supplied from the velocity detector 9a and indicative of the actual rotational speed S of the second servomotor 9. In FIG. 2, reference symbols C and D denote a capacitor and a diode, respectively.

In the following, the operation of the mold clamping apparatus constructed as mentioned above will be explained.

At the start of a mold-closing operation of the mold clamping apparatus 1, a commanded speed V0 for mold-closing is applied from the numerical control unit to the PWM control circuit 22 of the control circuit section 20 of the apparatus 1. The control circuit 22 delivers PWM signals PA–PF which vary depending upon the deviation between the commanded speed V0 and the actual rotational motor speed S corresponding to the output signal from the velocity detector 9a, so that corresponding ones of transistors TA'–TF' and TA–TF of the first and second transistor inverters 23 and 24, e.g., TA' and TA, are simultaneously turned ON and OFF. As a result, the same current IU, IV or IW flows in an associated one of U-, V- and W-phase windings of the first servomotor 8 and that of the second servomotor 9, so that both the servomotors rotate in the direction of the mold-closing (forward rotational direction) at the commanded speed. More specifically, the first and second servomotors 8, 9 rotate in synchronism with each other and produce the same output torque. Additionally, these servomotors 8, 9, each of which is of small capacity type, rapidly responds to the common control output (the driving currents IU, IV, IW) from the control circuit section 20, respectively.

With the forward rotation of the first and second servomotors 8 and 9, the upper and lower ball screws 61 and 71 of the upper and lower toggle sections 6 and 7, respectively coupled to these motors, rotate in the forward direction, so that the upper and lower heads 62, 72 and the respective third links 65, 75 of both the toggle sections coupled thereto are moved toward the movable platen 5. As the third links 65, 75 are moved toward the movable platen 5, the first and second links 63, 64; 73, 74 of the toggle sections 6, 7, which have been bent at their associated pins 68b, 78b until that time, gradually expand so as to cause the movable platen 5 to move toward the front platen 2, so that the movable platen 5 reaches its mold touch position wherein the mold halves mounted on the respective platens are in contact with each other. During the mold-closing operation, the operational phases of the upper and lower toggle sections 6, 7 are kept matched to each other so as to positively keep the movable platen 5 parallel to the front and rear platens 2 and 3, because the first and second servomotors 8, 9 rotate in synchronism with each other to produce the same output torque, and the upper and lower ball screws 61, 71 are directly connected to the servomotor output shafts, respectively, and further the toothed pulleys 61a, 71a integrally formed with the ball screws 61, 71 are coupled to each other through the timing belt 10, as mentioned above. For the same reasons, the toggle mechanism including the toggle sections 6, 7 applies a pressing force to the movable platen 5 uniformly over the entire surface thereof at the side facing the toggle mechanism, while the movable platen 5 is further moved from its mold touch position toward the front platen 2. Upon receipt of the pressing force, the movable platen 5 is moved to reach its mold clamping position at which the first and second links 63, 64; 73, 74 of the toggle sections 6, 7 establish therebetween a straight-line relationship shown in FIG. 1 so that the tie bars 4, 4' are extended to produce a desired mold clamping force. Thereafter, upon completion of cooling of molten resin which is injected into the mold by means of an injection mechanism, not shown, of the injection molding machine, the first and second servomotors 8, 9 are each rotated in a reverse direction to perform a mold-opening operation. Meanwhile, since the upper and lower ball screws 61, 71 are directly coupled to the motor output shafts, respectively, no substantial loss is found in transmission of the mold-clamping force, which would occur due to an elongation of a belt if the drive force produced by the servomotor is transmitted to the ball screw through a belt mechanism, and no backlash is found which would be produced if a gear mechanism is employed for transmission of the drive force. As a result, the parallelism among the three platens is positively kept unchanged.

The present invention is not limited to the foregoing embodiment, and various modifications thereof can be made. For instance, although the permanent-magnetic synchronous motor is employed for each of the two servomotors of the upper and lower toggle sections in the aforementioned embodiment, a DC or AC servomotor of another type may be employed. Further, instead of the toggle mechanism of a double toggle link, having the upper and lower toggle sections in the aforesaid embodiment, a toggle mechanism having a required number, other than two, of toggle sections may be used. Although the velocity detector is used for control of the servomotors, a combination of a position detector such as a pulse coder and a F/V (frequency-to-voltage) converter for converting an output from the position detector into a different output indicative of the rotational speed of a corresponding motor, may be used.

We claim:

1. A mold clamping apparatus for use in an electrically-operated injection molding machine, comprising:
   a first toggle section having a plurality of links operatively coupled to a first head member threadedly engaged with a first ball screw, said toggle section being disposed radially inwardly of said mold clamping apparatus with respect to said first ball screw, said first ball screw being separated radially outwardly of said mold clamping apparatus from a central axis of said mold clamping apparatus, said first ball screw extending in parallel to said axis, and said first ball screw being rotatably supported;
   a second toggle section having a plurality of links operatively coupled to a second head member threadedly engaged with a second ball screw, said second toggle section being disposed radially inwardly of said second ball screw, said second ball screw being separated radially outwardly of said mold clamping apparatus from said axis, said second ball screw being disposed at a side of said mold clamping apparatus remote from said first ball screw with respect to said axis, said second ball screw extending in parallel to said axis, and said second ball screw being rotatably supported;
   a first servomotor operatively coupled to said first ball screw;
   a second servomotor operatively coupled to said second ball screw; and
   control means for controlling drive of said first and second servomotors.

2. A mold clamping apparatus according to claim 1, wherein said control means includes means for detecting a control parameter associated with one of said first and second servomotors, said control parameter being indicative of one of an actual rotational speed and an actual position of said associated one servomotor; a control circuit for generating a common control signal which varies depending upon a deviation between a command and an output of said detector; and driving circuits each of which is operable in accordance with the common control signal supplied from said control circuit for driving a corresponding one of said first and second servomotors.

3. A mold clamping apparatus according to claim 1, wherein each of said first and second toggle sections includes a first link which is pivotally supported at one end by a rear platen of said injection molding machine, a second link having opposite ends pivotally supported by another end of said first link and said movable platen, respectively, and a third link having opposite ends pivotally supported by an intermediate portion of said first link and said head member, respectively.

4. A mold clamping apparatus according to claim 1, wherein said first and second toggle sections are disposed symmetrically with each other with respect to said axis of said mold clamping apparatus.

* * * * *